US012671010B2

(12) United States Patent
Huang et al.

(10) Patent No.: US 12,671,010 B2
(45) Date of Patent: Jun. 30, 2026

(54) BENT UNIT AND GAS-INSULATED TRANSMISSION LINE

(71) Applicant: Hitachi Energy Ltd, Zürich (CH)

(72) Inventors: Wei Huang, Tianjin (CN); Jieshen Nong, Xiamen (CN); TianSong Chen, Xiamen (CN); GuoZhu Meng, Xiamen (CN); Pei Peng, Xiamen (CN)

(73) Assignee: HITACHI ENERGY LTD, Zürich (CH)

( * ) Notice: Subject to any disclaimer, the term of this patent is extended or adjusted under 35 U.S.C. 154(b) by 0 days.

(21) Appl. No.: 18/864,674

(22) PCT Filed: Feb. 24, 2023

(86) PCT No.: PCT/EP2023/054749

§ 371 (c)(1),
(2) Date: Nov. 11, 2024

(87) PCT Pub. No.: WO2023/217426

PCT Pub. Date: Nov. 16, 2023

(65) Prior Publication Data

US 2025/0111962 A1 Apr. 3, 2025

(30) Foreign Application Priority Data

May 12, 2022 (CN) ......................... 202210516649.3

(51) Int. Cl.
*H01B 7/02* (2006.01)
*H01P 1/02* (2006.01)

(52) U.S. Cl.
CPC ............. *H01B 7/0233* (2013.01); *H01P 1/02* (2013.01)

(58) Field of Classification Search
CPC ... H01B 7/0233; H01B 9/0605; H01B 9/0616
(Continued)

(56) References Cited

U.S. PATENT DOCUMENTS 2,530,064 A * 11/1950 Jones ........................ H01P 1/02 333/260
3,391,243 A 7/1968 Whitehead
(Continued)

FOREIGN PATENT DOCUMENTS

CN 106785944 A 5/2017
CN 207398381 U 5/2018
(Continued)

OTHER PUBLICATIONS

International Search Report and Written Opinion of the International Searching Authority, PCT/EP2023/054759, mailed May 19, 2023, 15 pages.
(Continued)

*Primary Examiner* — Chau N Nguyen
(74) *Attorney, Agent, or Firm* — Sage Patent Group

(57) ABSTRACT

A bent unit and a gas-insulated transmission line having the same are provided. The bent unit includes: a bent housing including a cylindrical first housing section and a cylindrical second housing section, the first housing section and the second housing section being connected with each other at an angle α; a tubular bent conductor arranged in the bent housing; and an insulator arranged in the bent housing to support the bent conductor. The bent conductor includes a straight conductor section and a bent conductor section which are formed separately and connected with each other. The straight conductor section extends along the first housing section. The bent conductor section extends along the first housing section and the second housing section and is bent to have the angle α.

12 Claims, 6 Drawing Sheets

(58) Field of Classification Search
USPC .......................... 174/21 JC, 22 C, 21 CA, 28
See application file for complete search history.

(56) References Cited

U.S. PATENT DOCUMENTS

| | | | | | |
|---|---|---|---|---|---|
| 3,792,187 | A | * | 2/1974 | Depcrymski .......... | H02G 5/063 174/21 C |
| 3,943,470 | A | * | 3/1976 | Bingham ............. | H01R 9/0521 333/260 |
| 4,059,723 | A | * | 11/1977 | Floessel ................. | H02G 5/063 174/21 R |
| 4,711,973 | A | | 12/1987 | Meyer et al. | |
| 9,691,525 | B2 | * | 6/2017 | Chen .................. | H01B 11/1856 |

FOREIGN PATENT DOCUMENTS

| | | | | |
|---|---|---|---|---|
| DE | 29518804 | U1 | | 3/1997 |
| EP | 2676758 | | * | 12/2013 |
| JP | S60162408 | A | | 8/1985 |

OTHER PUBLICATIONS

International Preliminary Report on Patentability of the International Preliminary Examining Authority, PCT/EP2023/054759, mailed Mar. 11, 2024, 8 pages.

* cited by examiner

BENT UNIT AND GAS-INSULATED TRANSMISSION LINE

CROSS REFERENCE TO RELATED APPLICATIONS

This application is a 35 U.S.C. § 371 national stage applications of PCT International Application No. PCT/EP2023/054749 filed on Feb. 24, 2023, which in turn claims foreign priority to Chinese Patent Application No. 202210516649.3, filed on May 12, 2022, the disclosures and content of which are incorporated by reference herein in their entirety.

RELATED FIELD

The present disclosure generally relates to the technical field of high-voltage transmission, and more specifically to the technical field of gas-insulated transmission lines.

BACKGROUND

Gas insulated transmission lines (GIL) are generally installed in underground tunnels or vertical shafts, and have the advantages of excellent current-carrying capacity, small land occupation and easy maintenance. At present, GIL have been more and more widely used to replace overhead lines to realize power transmission. Due to the diversity of installation environment and line layout of GIL, there are normally many turnings in GIL engineering layout for changing the direction of GIL busbar/conductor.

FIG. 1 shows an elbow unit for GIL, wherein the elbow unit is used to connect with two adjacent straight units to change the direction of GIL busbar/conductor so as to further change the transmission direction. The elbow unit includes an elbow housing 1 (most of which is represented by dash double-dot lines) and an elbow conductor 2 arranged in the elbow housing 1. The elbow housing 1 is substantially spherical, and two ends thereof are connected with the housings of adjacent straight units via flanges 3. The elbow housing 1 is integrally formed by casting and therefore has long lead-time. Further, it is required to develop different molds for different turning angles, resulting in high manufacturing costs. The elbow conductor 2 includes two conductor parts 4 with complex shape, and the two conductor parts 4 are connected with each other to form the elbow conductor 2. The elbow conductor 2 has a complex structure and high cost.

It should be noted that this background technology section provides background information related to the content of the present disclosure, which may not necessarily constitute the prior art.

SUMMARY

An object of the present disclosure is to address the above issues and to provide an improved bent unit and an improved gas-insulated transmission line.

Therefore, a bent unit for a gas-insulated transmission line is provided according to a first aspect of the present disclosure. The bent unit includes: a bent housing including a cylindrical first housing section and a cylindrical second housing section, the first housing section and the second housing section being connected with each other at an angle α; a tubular bent conductor arranged in the bent housing; and an insulator arranged in the bent housing to support the bent conductor. The bent conductor includes a straight conductor section and a bent conductor section which are formed separately and connected with each other. The straight conductor section extends along the first housing section. The bent conductor section extends along the first housing section and the second housing section and is bent to have the angle α.

For the bent housing of the bent unit according to the present disclosure, the transmission direction can be easily changed by adjusting the connection angle of the first housing section and the second housing section and by adjusting the bending angle of the bent conductor section of the bent conductor, thus realizing a desired layout of the gas-insulated transmission line. Moreover, the bent unit has a simple structure and is easy to manufacture.

According to the above technical concept, the first aspect of the present disclosure may further include one or more of the following alternative forms.

In some alternative forms, the bent unit further includes a shield arranged inside the bent housing and sleeved outside the bent conductor, and a junction where the straight conductor section is connected with the bent conductor section is covered by the shield.

In some alternative forms, the insulator is arranged to support the bent conductor near the junction where the straight conductor section is connected with the bent conductor section.

In some alternative forms, the insulator is in the form of a three-post insulator, wherein the insulator includes an insulator body, and a metal bushing embedded in the center of the insulator body and extending through the insulator body; the straight conductor section is directed through the metal bushing and connected to the metal bushing at an end portion of the metal bushing; and a junction where the straight conductor section is connected with the end portion of the metal bushing is covered by the shield.

In some alternative forms, the straight conductor section includes a first connecting end plate, the bent conductor section includes a second connecting end plate, and the first connecting end plate and the second connecting end plate are connected with each other via a threaded fastener.

In some alternative forms, the first housing section and the second housing section are provided with a first inclined end face and a second inclined end face, respectively; and the first inclined end face and the second inclined end face are welded to each other.

In some alternative forms, the bent conductor includes one straight conductor section and one bent conductor section; and the bent conductor extends along the substantially entire length of the bent housing.

In some alternative forms, the length of the bent conductor ranges from 1 m to 18 m.

In some alternative forms, the angle α ranges from 160° to 179°.

According to a second aspect of the present disclosure, a gas-insulated transmission line is provided, wherein the gas-insulated transmission line includes at least one bent unit for a gas-insulated transmission line according to the first aspect of the present disclosure.

In some alternative forms, the gas-insulated transmission line includes a corner unit and an electrical contact, and the corner unit includes a conductor; and the bent conductor of the bent unit can be electrically connected with the conductor of the corner unit via the electrical contact.

In some alternative forms, the electrical contact includes a first connecting shoulder and a second connecting shoulder at both ends thereof, respectively; wherein the first connecting shoulder is connected with the bent conductor of the bent unit via a threaded fastener, and the second connecting shoulder is connected with the conductor of the corner unit by welding.

The bent unit and the gas-insulated transmission line having the same according to the present disclosure can easily realize the desired change of transmission direction, and are simple in structure and easy to manufacture.

BRIEF DESCRIPTION OF THE DRAWINGS

Other features and advantages of the present disclosure will be readily understood from the following preferred embodiments described in detail with reference to the accompanying drawings, in which the same reference numerals indicate the same or similar components.

DETAILED DESCRIPTION

Figure 1:
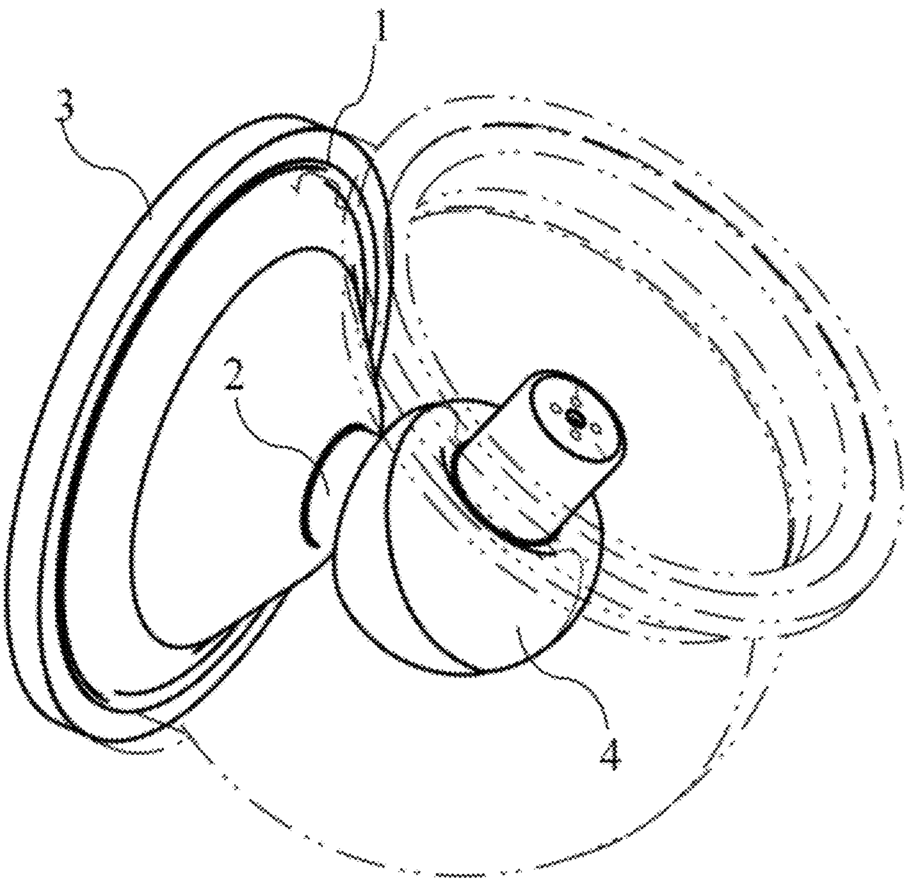
FIG. 1 PRIOR ART
FIG. 1 shows an elbow unit used for GIL in the background technology section, wherein most of an elbow housing of the elbow unit is represented by dash double-dot lines.

The implementation and usage of the embodiments are discussed in detail below. However, it is conceivable that the specific embodiments discussed are merely intended to illustrate specific ways of implementing and using the present disclosure, and are not intended to limit the scope of the present disclosure. When describing structures and positions of components, the orientation-related expressions herein, such as “upper”, “lower”, “top”, and “bottom”, are not absolute, but relative. When the components are arranged as shown in the drawings, these orientation-related expressions are appropriate, but when the positions of these components in the drawings are altered, these orientation-related expressions should be altered accordingly.

In the present disclosure, the axial direction of a cylindrical or tubular component refers to the direction along the central axis of the component, the circumferential direction of the cylindrical or tubular component refers to the direction along the circumference of the component, and the radial direction of the cylindrical or tubular component refers to the direction passing through the central axis of the component and perpendicular to the axial direction of the component.

A GIL may include a metal housing and electrical components/devices such as conductor/busbar. The metal housing defines an enclosed space filled with insulating gas, and the electrical components/devices are contained in the metal housing for safe electrical operations. The GIL as a whole may have a long length and be formed by multiple units connected with each other to realize long-distance transmission, which will be further described below.

Figure 2:
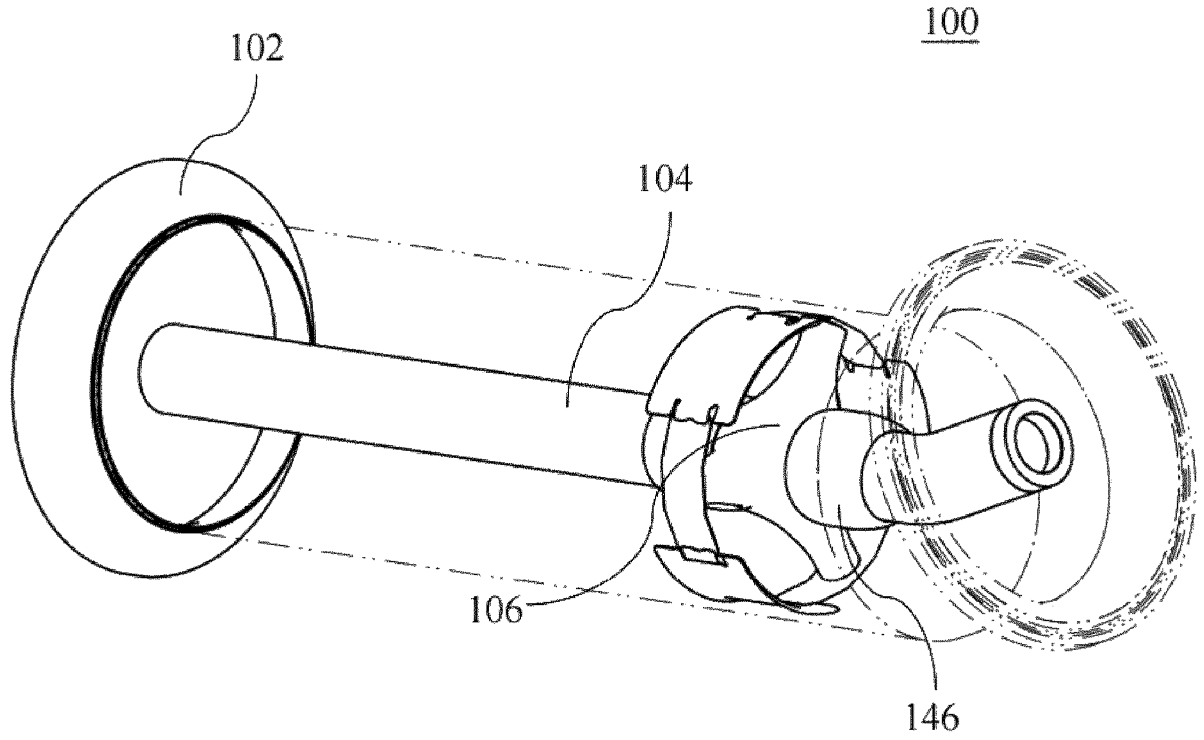
FIG. 2 shows a perspective view of a bent unit for GIL according to an exemplary embodiment of the present disclosure, wherein most of a bent housing of the bent unit is represented by dash double-dot lines.
Figure 3A:
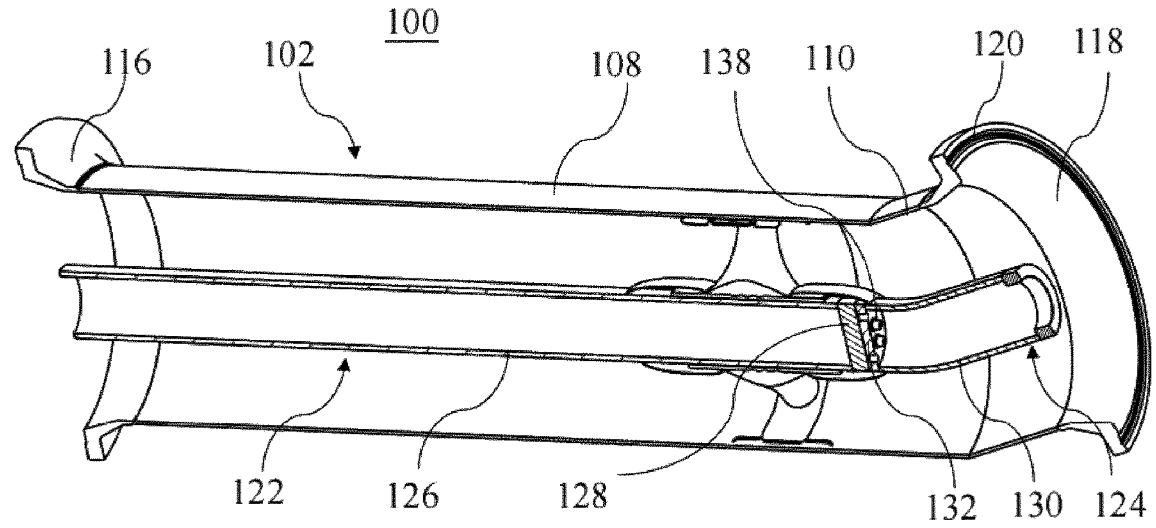
FIG. 3A and FIG. 3B show, from different perspectives, the cross-sectional views of the bent unit for GIL according to the exemplary embodiment of the present disclosure.
Figure 3B:
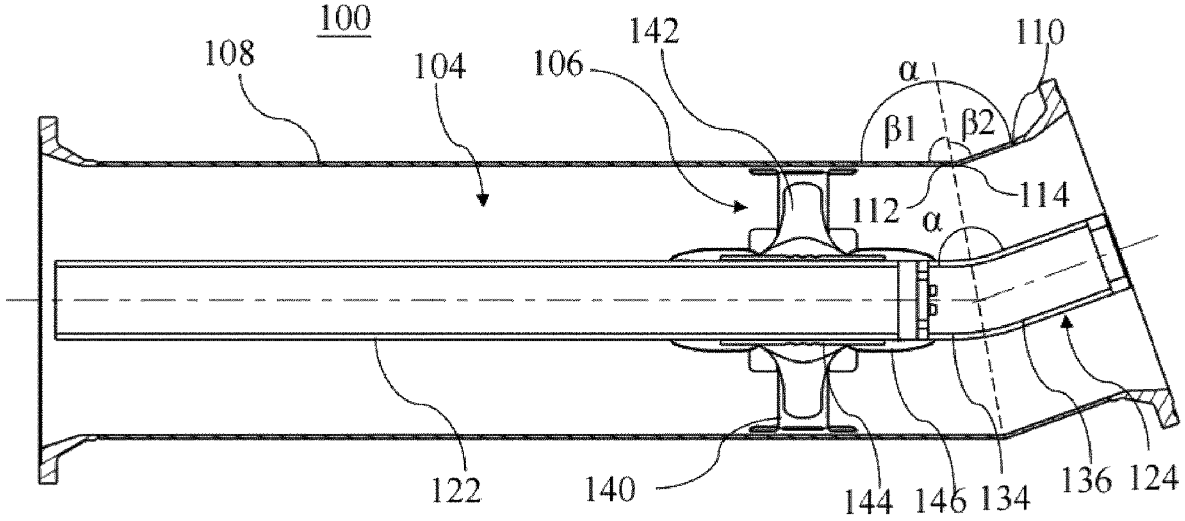

FIG. 2 to FIG. 3B show a bent unit 100 for GIL according to an embodiment of the present disclosure. Referring to FIG. 2, the bent unit 100 may include a bent housing 102, a tubular bent conductor 104 arranged in the bent housing 102, and an insulator 106 arranged in the bent housing 102 to support the bent conductor 104. Both the bent housing 102 and the bent conductor 104 may be made of metal materials such as aluminum, aluminum alloy and copper.

Referring to FIG. 3A and FIG. 3B, the bent housing 102 may include a straight cylindrical first housing section 108 and a straight cylindrical second housing section 110. The first housing section 108 and the second housing section 110 may be connected to each other at an angle $\alpha$.

In the illustrated embodiment, the first housing section 108 and the second housing section 110 may have the same diameter. The first housing section 108 and the second housing section 110 may be provided with a first inclined end face 112 and a second inclined end face 114, respectively. The first inclined end face 112 of the first housing section 108 forms a first inclined angle $\beta 1$ with respect to the axial direction of the first housing section 108. The second inclined end face 114 of the second housing section 110 forms a second inclined angle $\beta 2$ with respect to the axial direction of the second housing section 110. The first inclined angle $\beta 1$ equals the second inclined angle $\beta 2$, so that the first inclined end face 112 of the first housing section 108 and the second inclined end face 114 of the second housing section 110 can be exactly butted with each other and welded to each other in a sealed manner. The angle $\alpha$ between the first housing section 108 and the second housing section 110 equals to the sum of the first inclined angle $\beta 1$ and the second inclined angle $\beta 2$.

In some embodiments, semi-finished products of the cylindrical housing sections may be formed first, and then the inclined end faces may be formed by, for example, cutting at the ends of the semi-finished products of the housing sections. In this way, the angle $\alpha$ between the first housing section 108 and the second housing section 110 can be easily changed by changing the first inclined angle $\beta 1$ and the second inclined angle $\beta 2$ during cutting, so as to meet the demand for the bent housings with varied turning angles.

The bent housing 102 may be provided with a first flange 116 at an end, opposite to the first inclined end face 112, of the first housing section 108. The bent housing 102 may also be provided with a second flange 118 at an end, opposite to the second inclined end face 114, of the second housing section 110. The first flange 116 and the second flange 118 may be welded to the first housing section 108 and the second housing section 110, respectively. The first flange 116 and the second flange 118 are configured to connect the bent housing 102 to the housings of other units of the GIL. Two sealing rings 120 may be provided at the first flange 116 and the second flange 118, respectively, so as to achieve the sealing connection between the bent housing 102 and the housings of other units.

Referring to FIG. 3A and FIG. 3B, the bent conductor 104 may include a straight conductor section 122 and a bent conductor section 124 which are formed separately and connected with each other.

The straight conductor section 122 may extend along the first housing section 108. The straight conductor section 122 may include a first conductor body 126 and a first connecting end plate 128. In the illustrated embodiment, the first conductor body 126 is formed in one piece and in a straight shape. One end of the first conductor body 126 is connected with the first connecting end plate 128, and the other end of the first conductor body 126 is close to the first flange 116.

The bent conductor section 124 may extend along the first housing section 108 and the second housing section 110 and is bent to have the angle α. That is, the bent conductor section 124 has the same turning angle as the bent housing 102. In some embodiments, both the angle α of the bent housing 102 and the angle α of the bent conductor section 124 may range from 160° to 179°. This angle range can avoid electric breakdown of insulating medium caused by over high electric field strength at the bend of the bent conductor section 124.

The bent conductor section 124 may include a second conductor body 130 and a second connecting end plate 132. In the illustrated embodiment, the second conductor body 130 may be formed in one piece and in a bent shape. One end of the second conductor body 130 is connected with the second connecting end plate 132, and the other end of the second conductor body 130 is close to the second flange 118. The second conductor body 130 includes a first part 134 extending substantially in the axial direction of the first housing section 108 and a second part 136 extending substantially in the axial direction of the second housing section 110 from the first part 134. The first part 134 and the second part 136 are 15 connected with each other and form the angle α. An end portion of the first part 134 is connected with the second connecting end plate 132. In some embodiments, as shown in FIGS. 3A-3B, a distal end of the bent conductor section 124 is substantially co-planar with a distal end of the second housing section 110.

In some embodiments, the first conductor body 126 and the second conductor body 130 may be formed from the same pipe, the first conductor body 126 may be formed by cutting the pipe, and the second conductor body 130 may be formed by cutting the pipe and bending the pipe to have the angle α.

In the illustrated embodiment, the bent conductor 104 includes one straight conductor section 122 and one bent conductor section 124, and the bent conductor 104 extends along the substantially entire length of the bent housing 102. Compared with the case that the bent conductor includes multiple straight conductor sections and/or multiple bent conductor sections, forming the bent conductor 104 which extends along the substantially entire length of the bent housing 102 by connecting only one straight conductor section 122 with only one bent conductor section 124 reduces the number of accessories needed to connect the conductor sections and makes the bent unit 100 easy to assemble, and also reduces the connection resistance as much as possible. It is conceivable that the bent conductor 104 may include more than one straight conductor section and/or more than one bent conductor section. In some embodiments, the length of the bent conductor 104 may range from 1 m to 18 m, and the length of the straight conductor section 122 may be greater than the length of the bent conductor section 124. In some embodiments, the length of the straight conductor section 122 may range from 0.5 m to 17.5 m.

The first connecting end plate 128 of the straight conductor section 122 and the second connecting end plate 132 of the bent conductor section 124 may be mechanically and electrically connected to each other via threaded fasteners 138, to form the bent conductor 104. During the assembly of GIL, the conductors in the units may deviate/flex due to gravity and other factors, resulting in that the ends of the conductors in the adjacent units are difficult to align (i.e., generating assembly tolerance). The connection between the first connecting end plate 128 of the straight conductor section 122 and the second connecting end plate 132 of the bent conductor section 124 achieved by threaded fasteners 138 allows the straight conductor section 122 and the bent conductor section 124 to rotate and/or deviate relative to each other to compensate for the assembly tolerance. The thread fasteners 138 may be screw bolts or double ended screws. In some embodiments, the first connecting end plate 128 may be provided with threaded holes, and the second connecting end plate 132 may be provided with through holes. The threaded fasteners 138 can be screwed into the threaded holes of the first connecting end plate 128 through the through holes of the second connecting end plate 132, to connect the first connecting end plate 128 with the second connecting end plate 132. The diameter of the through holes is larger than the diameter of the threaded holes, so that the first connecting end plate 128 is allowed to deviate relative to the second connecting end plate 132 to compensate for the assembly tolerance while the through holes can be aligned with the threaded holes to achieve connection.

Figure 4:
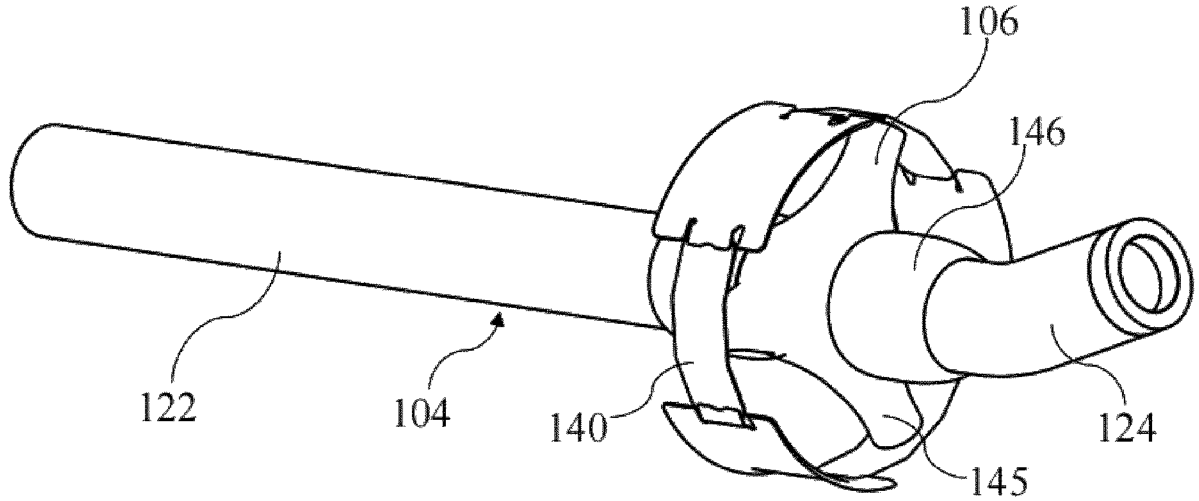
FIG. 4 shows another perspective view of the bent unit for GIL according to the exemplary embodiment of the present disclosure, wherein the bent housing of the bent unit is omitted.

Referring to FIG. 3B and FIG. 4, the insulator 106 may be arranged to support the bent conductor 104 near a junction where the straight conductor section 122 is connected with the bent conductor section 124. This provides support for the junction where the straight conductor section 122 is connected with the bent conductor section 124, and helps to improve the reliability of the connection.

In some embodiments, the insulator 106 may be in the form of a three-post insulator. The insulator 106 may include an insulator body 142, and a metal bushing 144 embedded in the center of the insulator body 142 and extending through the insulator body 142. The insulator body 142 may be made of an insulating material, such as epoxy resin, and may be connected to the bent housing 102 via, for example, connecting plates 140. The insulator body 142 includes three legs 145 extending radially to provide support between the bent housing 102 and the bent conductor 104. The metal bushing 144 may be made of a metal material, such as aluminum and aluminum alloy. The straight conductor section 122 of the bent conductor 104 is directed through the metal bushing 144 and connected to the metal bushing 144 at an end portion of the metal bushing 144 via fasteners. In this way, the three-post insulator 106 can directly support the straight conductor section 122 of the bent conductor 104. This is particularly advantageous when the straight conductor section 122 is longer than the bent conductor section 124, which helps to reduce the deviation or flexion of the straight conductor section 122 due to gravity and other factors.

The bent unit 100 further includes a shield 146 arranged inside the bent housing 102 and sleeved outside the bent conductor 104. The junction where the straight conductor section 122 is connected with the bent conductor section 124 is covered by the shield 146, so as to optimize the electric field distribution at the junction (for example, to avoid uneven electric field distribution caused by possible gap or deviation between the first connecting end plate 128 of the straight conductor section 122 and the second connecting end plate 132 of the bent conductor section 124) and to avoid point discharge. In some embodiments, the shield 146 can at least cover the first connecting end plate 128 of the straight conductor section 122 and the second connecting end plate 132 of the bent conductor section 124. In some embodiments, the shield 146 may further cover a junction where the straight conductor section 122 is connected with the end portion of the metal bushing 144, to optimize the electric field distribution at this junction and avoid point discharge caused by, for example, the fasteners at this junction. In this way, the optimization of the electric fields at the junction where the straight conductor section 122 is connected with the bent conductor section 124 and the junction where the straight conductor section 122 is connected with the metal bushing 144 can be achieved via one shield 146, simplifying the structure of the bent unit 100.

Figure 5:
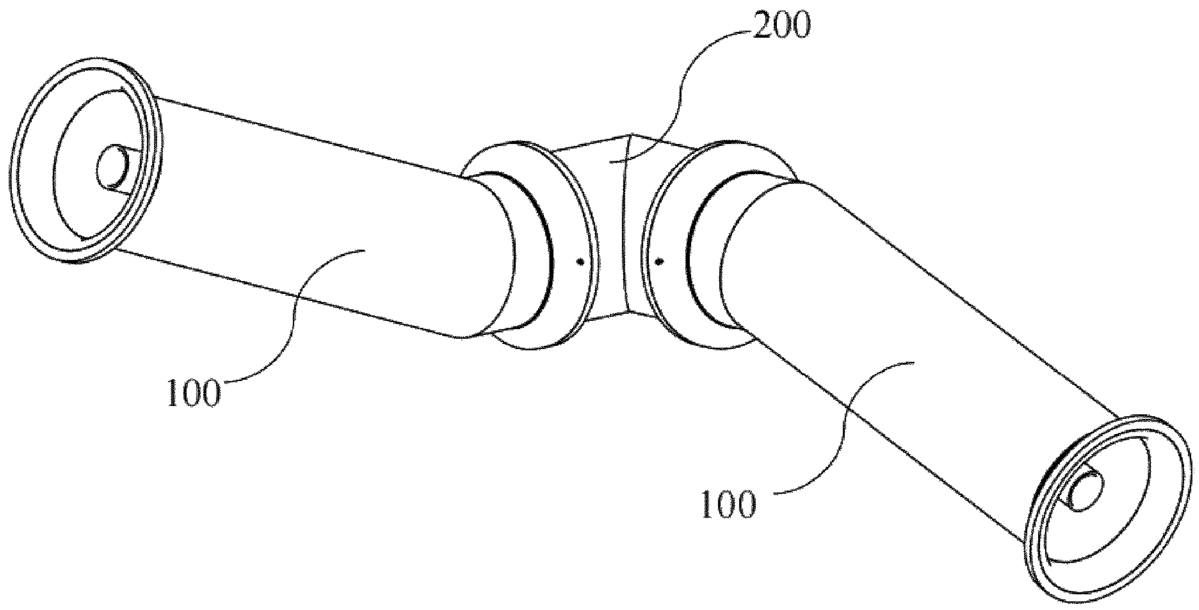
FIG. 5 shows a partial view of a GIL according an exemplary embodiment of the present disclosure.
Figure 6:
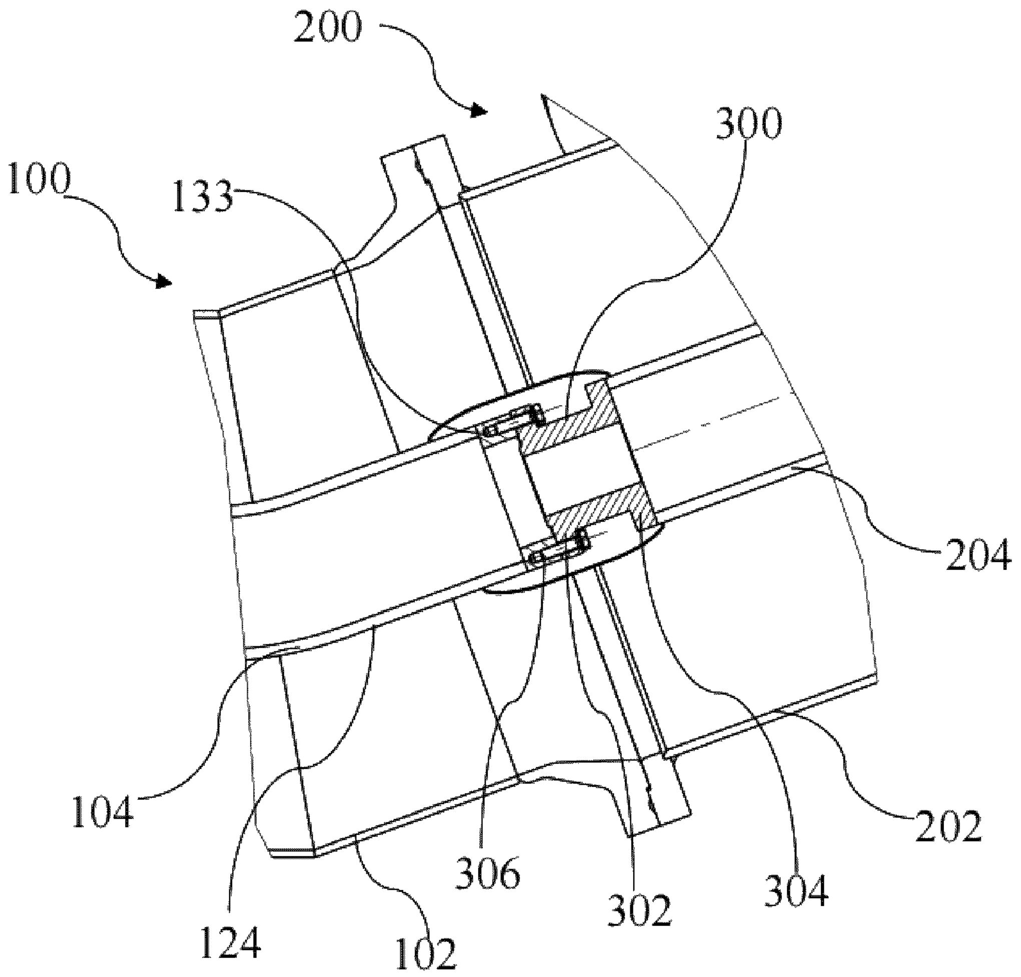
FIG. 6 shows a cross-sectional view of a junction where the bent unit for GIL according to the exemplary embodiment of the present disclosure is connected with a corner unit for GIL.

Referring to FIG. 5 and FIG. 6, the gas-insulated transmission line may include multiple bent units 100, multiple corner units 200 and multiple straight units (not shown). Both the bent unit 100 and the corner unit 200 can change the transmission direction of GIL. In this specification, the corner unit 200 is a unit that can change the transmission direction by approximately 90° to 159°, and the straight unit is a unit that does not change the transmission direction. The corner unit 200 includes a corner housing 202 and a conductor 204 arranged in the corner housing 202. The corner unit 200 generally has a small length as long as it can achieve the change of transmission direction. In some embodiments, the length of the corner unit 200 may range from 0.8 m to 3 m. In some embodiments, the corner unit 200 and the straight unit may be a conventional GIL corner unit and a conventional GIL straight unit.

The bent units 100, the corner units 200 and the straight units can be flexibly combined and connected according to the actual needs, so as to achieve the desired transmission line layout and adapt to complex line layout environment.

In particular, in some embodiments, as shown in FIG. 5 and FIG. 6, two ends of the corner unit 200 may be connected with two bent units 100 respectively to achieve a staircase-like trend of the transmission line winding from top to bottom. This allows the gas-insulated transmission line to more flexibly avoid surrounding obstacles.

Referring to FIG. 6, an end portion (specifically, an end portion of the bent conductor section 124) of the bent conductor 104 of the bent unit 100 may be electrically connected with the conductor 204 of the corner unit 200 via an electrical contact 300. The electric contact 300 is substantially tubular, and a first connecting shoulder 302 and a second connecting shoulder 304 are provided at two ends of the electrical contact 300, respectively. The first connecting shoulder 302 may be connected with the end portion of the bent conductor section 124 of the bent unit 100 via the threaded fasteners 306 to achieve the electrical connection between the electric contact 300 and the bent conductor 104. In the illustrated embodiment, the bent conductor section 124 has a connecting ring 133 at the end portion, and the connecting ring 133 is connected with the first connecting shoulder 302 via the threaded fasteners 306.

The second connecting shoulder 304 may be welded to an end portion of the conductor 204 of the corner unit 200 to achieve the electrical connection between the electric contact 300 and the conductor 204. In the case that the bent conductor 104 is supported and positioned by the insulator 106, compared with the conventional way of realizing the electrical connection between the conductor and the electric contact via a helical spring and by socket connection, realizing the electrical connection between the bent conductor 104, the electric contact 300 and the conductor 204 via the threaded fasteners 306 and by welding can also achieve the positioning of the conductor 204 in the corner housing 202 without additional positioning structure for the conductor 204, further simplifying the structure of the gas-insulated transmission line.

It is conceivable that, alternatively, the first connecting shoulder 302 may be connected with the bent conductor section 124 of the bent unit 100 by welding, and the second connecting shoulder 304 may be connected with the conductor 204 of the corner unit 200 via threaded fasteners.

It should also be understood that the various components and features described herein can be made of a variety of materials, including, but not limited to, polymer, rubber, metal and other suitable materials or combinations of materials familiar to those skilled in the art. The embodiments shown in FIGS. 2 to 6 only illustrate the shape, size and arrangement of the optional components of the bent unit according to the present disclosure. However, these embodiments are merely intended to illustrate, rather than limit. Other shapes, sizes and arrangements may be adopted without departing from the idea and scope of the present disclosure.

The technical contents and technical features of the present disclosure have been disclosed above. However, it can be understood that, those skilled in the art can make various changes and improvements to the above-disclosed concept under the creative concept of the present disclosure, and all these various changes and improvements still fall within the protection scope of the present disclosure. The description of the foregoing embodiments is illustrative rather than restrictive, and the protection scope of the present disclosure is determined by the appended claims.

The invention claimed is:

1. A bent unit for a gas-insulated transmission line, comprising:

a bent housing comprising a cylindrical first housing section and a cylindrical second housing section, the first housing section and the second housing section being connected with each other at an angle (α);

a tubular bent conductor arranged in the bent housing; and an insulator arranged in the bent housing to support the bent conductor;

wherein the bent conductor comprises a straight conductor section and a bent conductor section which are formed separately and connected with each other; the straight conductor section extends along the first housing section; and the bent conductor section extends along the first housing section and the second housing section, and is bent to have the angle (α);

wherein a distal end of the bent conductor section is substantially co-planar with a distal end of the second housing section.

2. The bent unit for a gas-insulated transmission line according to claim 1, wherein the first housing section and the second housing section are provided with a first inclined end face and a second inclined end face, respectively, and the first inclined end face and the second inclined end face are welded to each other.

3. The bent unit for a gas-insulated transmission line according to claim 1, wherein the bent conductor comprises one straight conductor section and one bent conductor section, and the bent conductor extends along the substantially entire length of the bent housing.

4. The bent unit for a gas-insulated transmission line according to claim 1, wherein the length of the bent conductor ranges from 1 m to 18 m.

5. The bent unit for a gas-insulated transmission line according to claim 1, wherein the angle (α) ranges from 160° to 179°.

6. A gas-insulated transmission line, comprising the bent unit for a gas-insulated transmission line according to claim 1.

7. The gas-insulated transmission line according to claim 6, wherein the gas-insulated transmission line comprises a corner unit and an electrical contact, and the corner unit comprises a conductor; wherein the bent conductor of the bent unit is electrically connected with the conductor of the corner unit via the electrical contact.

8. The gas-insulated transmission line according to claim 7, wherein the electrical contact comprises a first connecting shoulder and a second connecting shoulder at both ends thereof, respectively;

wherein the first connecting shoulder is connected with the bent conductor of the bent unit via a threaded fastener, and the second connecting shoulder is connected with the conductor of the corner unit by welding.

9. A bent unit for a gas-insulated transmission line, comprising:

a bent housing comprising a cylindrical first housing section and a cylindrical second housing section, the first housing section and the second housing section being connected with each other at an angle ($\alpha$);

a tubular bent conductor arranged in the bent housing;

an insulator arranged in the bent housing to support the bent conductor;

a shield arranged inside the bent housing and sleeved outside the bent conductor; and a junction where a straight conductor section is connected with a bent conductor section is covered by the shield, wherein the bent conductor comprises the straight conductor section and the bent conductor section which are formed separately and connected with each other; the straight conductor section extends along the first housing section; and the bent conductor section extends along the first housing section and the second housing section, and is bent to have the angle ($\alpha$).

10. The bent unit for a gas-insulated transmission line according to claim 9, wherein the insulator is arranged to support the bent conductor near the junction where the straight conductor section is connected with the bent conductor section.

11. The bent unit for a gas-insulated transmission line according to claim 10, wherein the insulator is in the form of a three-post insulator; the insulator comprises an insulator body, and a metal bushing embedded in the center of the insulator body and extending through the insulator body; the straight conductor section is directed through the metal bushing and connected to the metal bushing at an end portion of the metal bushing; and a junction where the straight conductor section is connected with the end portion of the metal bushing is covered by the shield.

12. A bent unit for a gas-insulated transmission line, comprising:

a bent housing comprising a cylindrical first housing section and a cylindrical second housing section, the first housing section and the second housing section being connected with each other at an angle ($\alpha$);

a tubular bent conductor arranged in the bent housing; and an insulator arranged in the bent housing to support the bent conductor;

wherein the bent conductor comprises a straight conductor section and a bent conductor section which are formed separately and connected with each other; the straight conductor section extends along the first housing section; and the bent conductor section extends along the first housing section and the second housing section, and is bent to have the angle ($\alpha$); the straight conductor section comprises a first connecting end plate; the bent conductor section comprises a second connecting end plate; and the first connecting end plate and the second connecting end plate are connected with each other via a threaded fastener.

* * * * *